United States Patent
Kapila et al.

(10) Patent No.: US 10,185,985 B1
(45) Date of Patent: Jan. 22, 2019

(54) TECHNIQUES FOR ITEM PROCUREMENT

(71) Applicant: Amazon Technologies, Inc., Reno, NV (US)

(72) Inventors: SaiPrasad Kapila, Redmond, WA (US);
Musachy Barroso, Seattle, WA (US);
Kristy Ann Caster, Seattle, WA (US);
Ernesto Gonzalez, Bellevue, WA (US);
Max Lee Kanter, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 250 days.

(21) Appl. No.: 14/040,360

(22) Filed: Sep. 27, 2013

(51) Int. Cl.
*G06Q 30/06* (2012.01)

(52) U.S. Cl.
CPC .................. *G06Q 30/0637* (2013.01)

(58) Field of Classification Search
None
See application file for complete search history.

(56) References Cited

U.S. PATENT DOCUMENTS

| 7,330,846 | B1 | 2/2008 | Dirisala et al. | |
|---|---|---|---|---|
| 2002/0184101 | A1* | 12/2002 | Gidadhubli | G06Q 20/382 |
| | | | | 705/26.1 |
| 2004/0133489 | A1* | 7/2004 | Stremler | G06Q 10/10 |
| | | | | 705/35 |
| 2004/0148309 | A1* | 7/2004 | Resch | G06Q 10/06 |
| 2008/0177635 | A1* | 7/2008 | Handel | G06Q 20/10 |
| | | | | 705/26.1 |
| 2009/0313045 | A1* | 12/2009 | Boyce | G16H 10/20 |
| | | | | 705/3 |
| 2011/0010612 | A1* | 1/2011 | Thorpe | G06F 17/30899 |
| | | | | 715/234 |
| 2011/0258083 | A1* | 10/2011 | Ren | G06Q 10/087 |
| | | | | 705/27.1 |
| 2011/0282738 | A1* | 11/2011 | Thomas | G06Q 30/02 |
| | | | | 705/14.49 |
| 2012/0221304 | A1* | 8/2012 | Zecheria | G06Q 10/06 |
| | | | | 703/6 |
| 2013/0110662 | A1* | 5/2013 | Dezelak | G06Q 30/0601 |
| | | | | 705/26.1 |

OTHER PUBLICATIONS

United States Patent and Trademark Office, "35 USC 112(f)*: Evaluating 112(f) limitations in Software-Related Claims for Definiteness under 35 USC 112(b)" PowerPoint Training.*

(Continued)

*Primary Examiner* — Jason B Dunham
*Assistant Examiner* — Brittany E Bargeon
(74) *Attorney, Agent, or Firm* — Kilpatrick Townsend & Stockton LLP

(57) ABSTRACT

A user registers with a reverse procurement service. The user then searches an electronic marketplace, which is external to a remote procurement service and, subsequently, selects various items to be placed in a shopping cart or project. Upon checkout, the items are submitted for approval to the remote procurement service which is external to the reverse procurement service. The remote procurement service obtains approval and sends payment information to the reverse procurement service. Upon receive of payment information, the reverse procurement service then initiates a process for providing the approved items to the user.

10 Claims, 5 Drawing Sheets

(56) References Cited

OTHER PUBLICATIONS

Sliwa, Carol, "Procurement App Tracks Expenses", Oct. 12, 1998, Computerworld, p. 41.*
Sliwa, Carol, "Procurement App Tracks Expenses", Oct 12, 1998, Computerworld, p. 41. (Year: 1998).*
U.S. Appl. No. 14/040,135, U.S. Patent Application, filed Sep. 27, 2013, Titled: Techniques for Item Procurement.

* cited by examiner

TECHNIQUES FOR ITEM PROCUREMENT

CROSS REFERENCES TO RELATED APPLICATIONS

This application incorporates by reference for all purposes the full disclosure of co-pending U.S. patent application Ser. No. 14/040,135, filed Sep. 27, 2013, entitled "TECHNIQUES FOR ITEM PROCUREMENT".

BACKGROUND

A large number of companies currently use procurement systems in order to obtain items (e.g., goods and/or services) from an electronic marketplace. However, ordering through a procurement system from an external electronic marketplace currently requires a user to have access to his company's internal network, as well as access to a virtual private network, to log into the procurement system. Only when logged in via the company's internal network and/or virtual private network, can the user select various items from the electronic marketplace, place the items in an electronic shopping cart, obtain approval for the items in the shopping cart (e.g., from a manager) and, eventually, "check out" (e.g., initiate payment for the items in the shopping cart). However, such conventional attempts to provide users the ability to procure items from an external electronic marketplace utilizing an internal procurement system are inefficient, ineffective and/or have undesirable side effects or other drawbacks.

BRIEF DESCRIPTION OF THE DRAWINGS

Various embodiments in accordance with the present disclosure will be described with reference to the drawings, in which.

DETAILED DESCRIPTION

Figure 1:
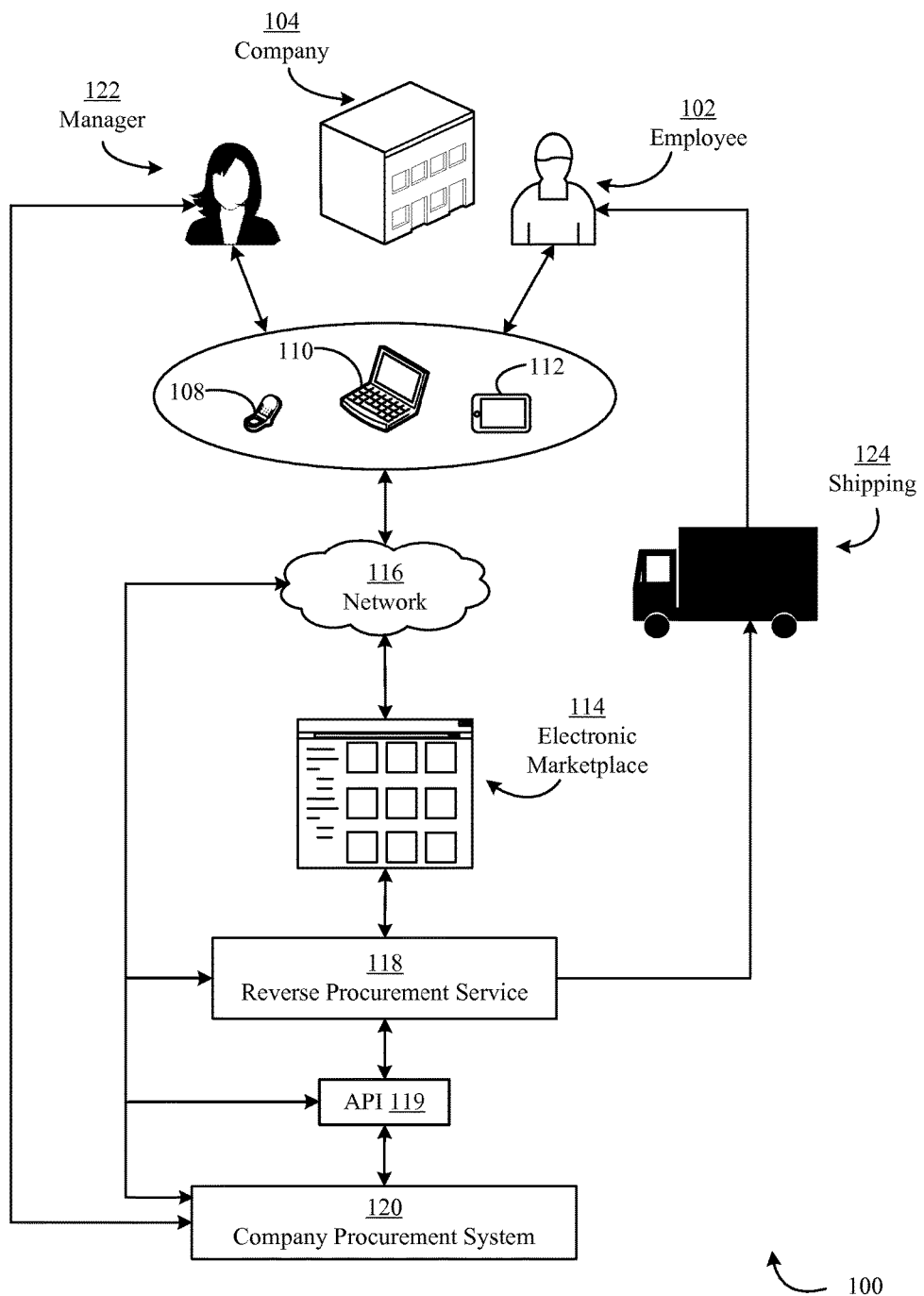
FIG. 1 illustrates an example environment for implementing features of a reverse procurement service according to at least one example.

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program or module including a plurality of instructions executable by one or more processors. The computer-readable storage medium may be non-transitory.

Techniques described herein are directed to systems and methods to enable a user to procure items from an external electronic marketplace utilizing intra-company procurement processes. Such intra-company procurement processes may include obtaining approval for an item purchase from another user authorized to make such approval decisions. As used herein, the term "procuring" includes, but is not limited to, purchasing, renting, leasing, or otherwise obtaining items from an electronic marketplace. Though "purchasing" is used in examples contained herein, any method of obtaining items may apply. As used herein, "workflow" refers to a sequence of one or more tasks to be completed. As used herein, a "remote procurement system" may be operated by, or on behalf of, an entity with whom a user is affiliated. For example, a remote procurement system may be operated by, or on behalf of, a company for whom the user is employed. It should be appreciated that the electronic marketplace discussed herein may be operated independently of the remote procurement system.

Systems and methods in accordance with various embodiments of the present disclosure may overcome one or more of the aforementioned and other deficiencies experienced in conventional approaches to procuring items from an external electronic marketplace utilizing the procurement system or information obtained from the procurement system. As part of a system or method for procuring items from an external electronic marketplace utilizing a procurement system, a reverse procurement service may be provided. In at least one embodiment, the reverse procurement service may be internal or external with respect to the electronic marketplace, and the electronic marketplace is external to, and separate from, the procurement system. In at least one example, the reverse procurement service may be external with respect to the procurement service. To utilize such a service, a user may navigate to a network site that offers items for consumption, the site offered by an electronic marketplace. Once at the site, the user may register with the reverse procurement service by submitting registration information via the electronic marketplace, the registration information indicating, at least, some affiliation with a company or other entity. For instance, this affiliation may indicate that the user is an employee of the company, authorized to procure items on the company's behalf, subject to approval. Once registered, the user may search the external marketplace for items using a search query, a scanner, a mobile application, or any other manner of item search available. When search results are provided, the user may select various items to add to his or her electronic shopping cart. The shopping cart may hold a record of the items the user has added to the cart that have not yet been procured by the user. When the user has decided that she is finished shopping, she may select the "check out" option that indicates that she wishes to obtain the items in her shopping cart.

In at least one embodiment, following check out, the reverse procurement service may determine, based on the identity of the user, a workflow associated with obtaining approval for procuring the items contained in the shopping cart. The reverse procurement service, utilizing an application programming interface, may cause the company's internal procurement system to begin a workflow for obtaining approval. One such workflow might include notifying the user's manager that there is a pending approval request for items requested by the user. If the manager approves the items via the company's procurement system, payment information may be sent from the company's procurement system and received by the reverse procurement service. At such time, payment for the items may be processed and, upon successful completion of the payment, a process for providing the items may be initiated by the reverse procurement service. This may include, but is not limited to, shipping the items to the user.

In at least one embodiment, the user may be associated with a charitable organization. Perhaps the user is a teacher who is affiliated with a charity that deals with providing books for young children. In this example, the teacher may navigate to a network site that offers items for consumption, the site offered by an external electronic marketplace. Once there, the teacher may register as discussed above and provide an indication of the teacher's affiliation with a charitable organization. The teacher may then choose to create a project and designate an affiliation between the charitable organization and the project. The project may then be associated with an electronic shopping cart storing items to be purchased for the project from the external marketplace. The shopping cart may then be stored by the electronic marketplace, perhaps as part of the teacher's user profile.

Continuing with this example, consider the case where the teacher creates a project named "Silvercity Elementary's August Book Drive." The teacher may then search for books for her students and add the books she wishes to procure to an electronic shopping cart associated with the project. Once she has completed her search, she may submit her project (including the shopping cart) to various philanthropic entities for funding. Perhaps various local companies have indicated an interest in children's book drives or charitable interests in general. The reverse procurement service may determine to which philanthropic entities to send a funding request based on, for instance, a common affiliation to a charitable organization between the teacher and the philanthropic entity. In at least one example, the philanthropic entity may actually be the charitable organization. In another example, the project may have a common affiliation with the philanthropic entity. However, it should be noted that a common affiliation is not required. Rather, the teacher may instead specify one or more philanthropic entities for which she would like to submit a project funding request. In response to at least one philanthropic entity being identified, the request may be sent to the one or more philanthropic entities via an application programming interface. The application programming interface, perhaps via a secure channel, may be used to communicate with the philanthropic entity's procurement system and initiate a workflow to obtain approval for funding. In one example, this workflow includes notifying an employee of the entity, authorized to make such approval decisions, that review of the request is required.

Upon approval of at least one item contained in shopping cart associated with the project, the company's procurement system may send an approval indication and/or payment information for the approved items stored in the electronic shopping cart associated with the project. Once the reverse procurement service receives payment information and processes a successful payment for the items, the reverse procurement service may notify the teacher of the approval and prompt the teacher for shipping information. In at least one example, the teacher may have already indicated shipping preferences when creating or modifying the shopping cart associated with the project, in which case, the indicated shipping preferences may be used to provide the purchased books to the teacher.

Thus, in accordance with embodiments, systems and methods are provided for enabling a user to procure items from an external electronic marketplace utilizing a procurement system.

Referring now to the drawings, in which like reference numerals represent like parts, FIG. 1 illustrates an example environment 100 for implementing the features of a reverse procurement service. A user, for instance an employee 102, associated with a company 104 may utilize an electronic device to search for items to procure on the behalf of the company 104. The electronic devices may include, but are not limited to, a mobile phone 108, a laptop computer 110, or a scanner 112 (such as a bar code scanner), to name a few. However, the employee 102 may utilize any type of computing device. Illustratively, any of the electronic devices may be a personal computing device, hand held computing device, terminal computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), or some other electronic device or appliance.

In some examples, the electronic device may be in communication with an external electronic marketplace 114 (e.g., an electronic marketplace that is outside of the company's intranetwork) via a network 116. For example, the network 116 may be a publicly accessible network of linked networks, possibly operated by various distinct parties, such as the Internet. The network 116 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

In at least one example, the employee 102 may utilize the external electronic marketplace 114 to select one or more items he wishes to procure for the company 104. The employee 102, in one example, may navigate to a network site provided by the external electronic marketplace 114 and register with a reverse procurement service 118. After registration, the employee 102 may search for various items, perhaps utilizing keywords in a search query inputted via the external electronic marketplace 114. In another example, the employee 102 may utilize a scanner 112, or another device, for instance, a mobile phone 108 utilizing an application operable to scan bar codes, to scan a bar code of an item, thus obtaining an item identification number used for search. Regardless of search method, once items are found, the employee 102 may select various items to be placed in a shopping cart. The user, at some point, may "check out," indicating that they wish to submit the items contained in the shopping cart for, in this example, purchase approval. Though purchasing is used in this example, any type of procurement may be used such as renting, leasing, or otherwise obtaining an item offered for consumption. In addition, although an electronic shopping cart is described, other mechanisms can be used for accumulating items of interest.

In at least one embodiment, upon check out, the reverse procurement service 118 may determine an approval workflow based on information associated with the employee 102, for example, information entered during registration or otherwise received because of the user's communication session with the external electronic marketplace 114. An approval workflow, as used herein, consists of a sequence of tasks that may be executed in order to obtain approval to use a company's procurement system, or information from the procurement system, such as payment information, to purchase the requested items. One such approval workflow may include sending a request for approval, via an application programming interface 119 sent via the network 116, to a company procurement system 120. In one example, the application programming interface 119 may stimulate the company procurement system 120 to send an approval request to a manager 122 (e.g., via electronic mail message, text message, voicemail message, electronic posting, etc.), or another company employee responsible for approving requests of this nature. The manager 122 may approve the request via the typical approval process as defined by the company procurement system 120. Upon approval, the company procurement system 120 may send to the external electronic marketplace 114, utilizing traditional interfaces, payment information to be used in the purchase of the approved items. The reverse procurement service 118, upon receipt of the payment information, may then prompt the employee 102 for shipping information. Alternatively, the employee 102 may have already indicated shipping information and preferences on check out, or such information may otherwise be available to the system. Once shipping information and preferences are ascertained, the reverse procurement service 118 may initiate another process to provide the item to the employee 102 according to the shipping information and preferences. The approved items may then be shipped to the user via traditional shipping methods 124. Though shipping is used in this example, any form of delivery, including electronic delivery, may be utilized to provide the items to the employee 102.

Figure 2:
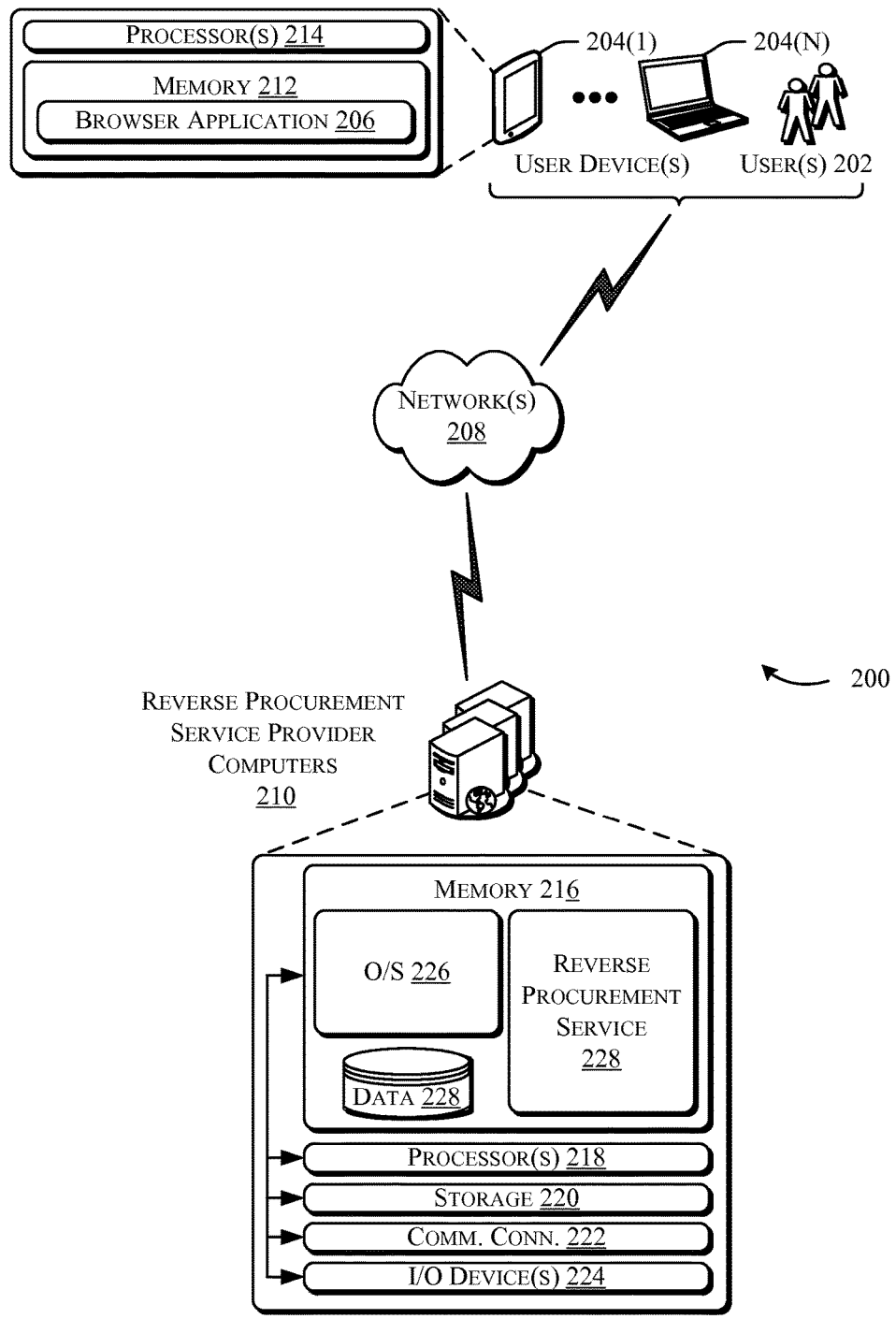
FIG. 2 illustrates an example computer architecture for providing a reverse procurement service in accordance with at least one embodiment.

FIG. 2 depicts an illustrative system or architecture 200 for enabling a user to procure items from an external electronic marketplace 114 utilizing reverse procurement service provider computer(s) 210. In architecture 200, one or more users 202 (e.g., electronic marketplace consumers or browser users) may utilize user computing devices 204(1)-(N) (collectively, user computing devices 204) to access a browser application 206 (e.g., a web browser) or a user interface accessible through the browser application 206 via one or more network 208. The user computing devices may include the same or similar user devices discussed in FIG. 1 (e.g., the mobile phone 108, the laptop computer 110, or the scanner 112). In some aspects, content presented on the user computing devices 204 by browser application 206 may be hosted, managed, and/or provided by reverse procurement service provider computer(s) 210. The one or more reverse procurement service provider computers 210 may, in some examples, provide computing resources such as, but not limited to, client entities, low latency data storage, durable data storage, data access, management, virtualization, hosted computing environment (e.g., "cloud-based)" software solutions, electronic content performance management, etc.

In some examples, the network 208, may be the same or similar to the network 116, and may include any one or a combination of many different types of networks, such as cable networks, the Internet, wireless networks, cellular networks and other private and/or public networks. While the illustrated example represents the users 202 accessing the browser application 206 (e.g., browser applications such as SAFARI®, FIREFOX®, etc., or native applications) over the network 208, the described techniques may equally apply in instances where the users 202 interact with the reverse procurement service provider computers 210 via the one or more user computing devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, As discussed above, the user computing devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user computing devices 204 may be in communication with the reverse procurement service provider computers 210 via the network 208, or via other network connections. Additionally, the user computing devices 204 may be part of the distributed system managed by, controlled by, or otherwise part of the reverse procurement service provider computers 210.

In one illustrative configuration, the user computing devices 204 may include at least one memory 212 and one or more processing units (or processor device(s)) 214. The memory 212 may store program instructions that are loadable and executable on the processor device(s) 214, as well as data generated during the execution of these programs. Depending on the configuration and type of user computing devices 204, the memory 212 may be volatile (such as random access memory (RAM)) and/or non-volatile (such as read-only memory (ROM), flash memory, etc.). The user computing devices 204 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the contents of the memory 212 in more detail, the memory 212 may include an operating system and one or more application programs, modules, or services for implementing the features disclosed herein including at least the perceived latency, such as via the browser application 206 or dedicated applications (e.g., smart phone applications, tablet applications, etc.). The browser application 206 may be configured to receive, store, and/or display a network pages generated by a network site (e.g., the external electronic marketplace 114), or other user interfaces for interacting with the reverse procurement service provider computers 210. Additionally, the memory 212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the reverse procurement service provider computers 210 may also be any type of computing devices and may include any number of server computing devices, desktop computing devices, mainframe computers, and the like. Moreover, the reverse procurement service provider computers 210 could include a mobile phone, a smart phone, a personal digital assistant (PDA), a laptop computer, a thin-client device, a tablet PC, etc. Additionally, it should be noted that in some embodiments, the reverse procurement service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the reverse procurement service provider computers 210 may be in communication with the user computing devices 204 and/or other service providers via the network 208, or via other network connections. The reverse procurement service provider computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the reverse procurement service provider computers 210 may include at least one memory 216 and one or more processing units (or processor device(s)) 218. The memory 216 may store program instructions that are loadable and executable on the processor device(s) 218, as well as data generated during the execution of these programs. Depending on the configuration and type of reverse procurement service provider computers 210, the memory 216 may be volatile (such as RAM) and/or non-volatile (such as ROM, flash memory, etc.). The reverse procurement service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 216 may include multiple different types of memory, such as SRAM, DRAM, or ROM.

The memory 216, the additional storage 220, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 216 and the additional storage 220 are all examples of non-transitory computer storage media. Additional types of computer storage media that may be present in the reverse procurement service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the reverse procurement service provider computers 210. Combinations of any of the above should also be included within the scope of computer-readable media.

The reverse procurement service provider computers 210 may also contain communications connection interface(s) 222 that allow the reverse procurement service provider computers 210 to communicate with a stored database, another computing device or server, user terminals and/or other devices on the network 208. The reverse procurement service provider computers 210 may also include I/O device(s) 224, such as a keyboard, a mouse, a pen, a voice input device, a touch input device, a display, speakers, a printer, etc.

Turning to the contents of the memory 216 in more detail, the memory 216 may include an operating system 226, one or more data stores 228, and/or one or more application programs, modules, or services for implementing the features disclosed herein including a reverse procurement service 230.

Figure 3:
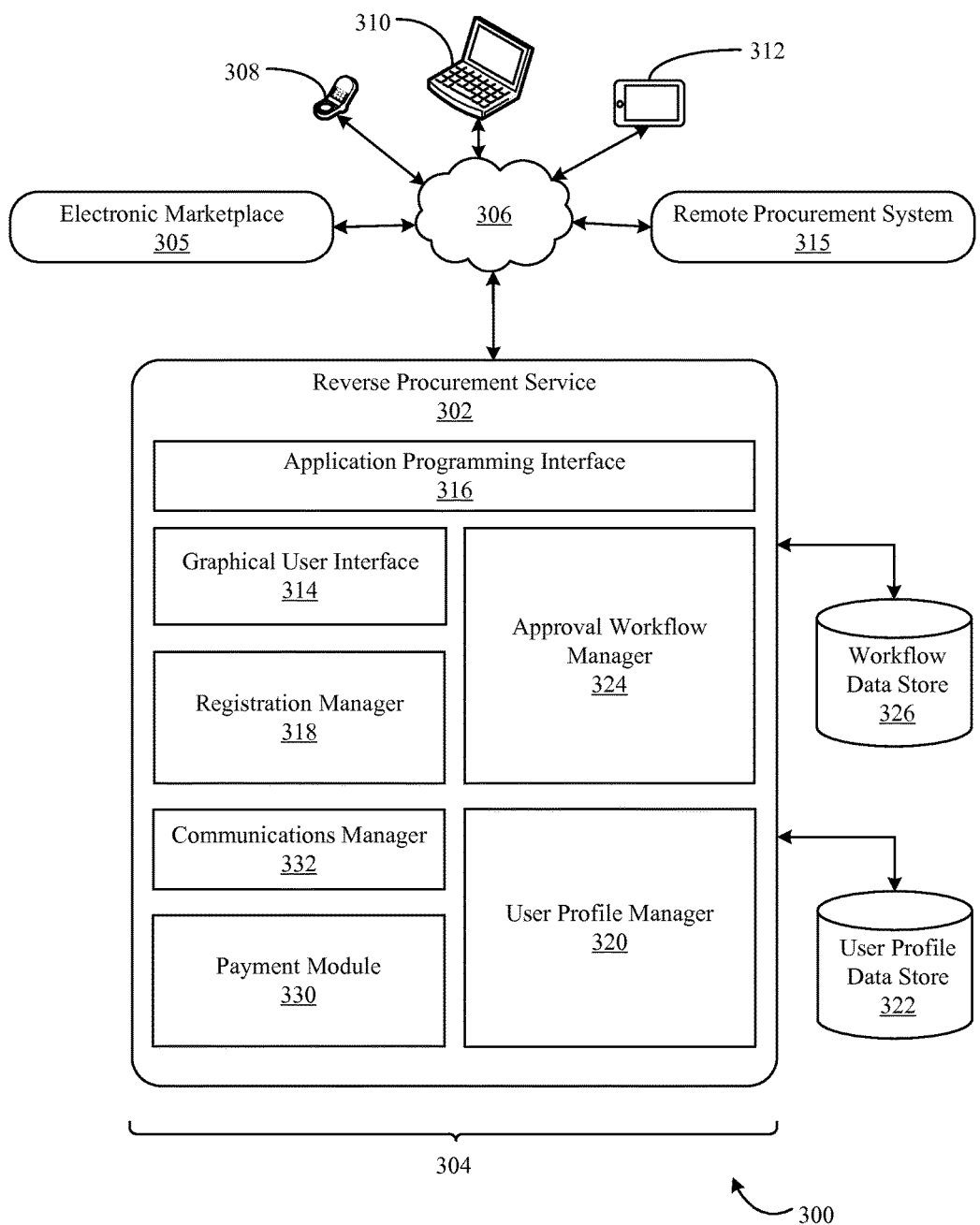
FIG. 3 schematically illustrates an example computer architecture for the reverse procurement service of FIG. 2, including a plurality of components that may carry out various embodiments.

FIG. 3 schematically illustrates an example architecture 300 for a reverse procurement service 302 (e.g., the reverse procurement service 230 of FIG. 2) that may be implemented by one or more reverse procurement service provider computers (e.g., reverse procurement service provider computers 210 of FIG. 2) and that may include a plurality of modules 304 that may carry out various embodiments. The modules 304 can be embodied on a non-transitory computer readable medium and processed by a processor in any of the computer systems described herein. It should be noted that any module or data store described herein, may be, in some embodiments, a service responsible for managing data of the type required to make corresponding calculations. The modules may be configured in the manner suggested in FIG. 3 or may exist as separate modules or services external to the reverse procurement service 302.

In accordance with at least one embodiment, a method is enabled for procuring items offered for consumption by an external electronic marketplace 305 (e.g., the external electronic marketplace 114), utilizing a reverse procurement service 302. For example, a user may visit the external electronic marketplace 305 where he or she may enter and submit search terms into a search query interface via an electronic device communicating with a network 306. The network 306 may be the same or similar as the network 116 and 208 described above. The electronic device may include, but is not limited to, a cell phone 308, a laptop computer 310, and a tablet personal computer 312, to name a few. These devices may be the same or similar to those described in FIGS. 1 and 2.

In at least one embodiment, the user may be required to enter registration information prior to using the reverse procurement service 302. This information can include, but is not limited to, name, physical address, phone number, and email address. In at least one example, the user may be prompted for registration information when attempting to select items to be added to a shopping cart. In an alternative example, the user may choose to enter registration information at any time during his shopping experience. The user may enter registration information via a graphical user interface provided by the external electronic marketplace 305 or, alternatively, via a graphical user interface provided by a graphical user interface module 314 of the reverse procurement service 302. As discussed above, the reverse procurement service 302 may be internal or external to the external electronic marketplace 305, but is external with respect to, or separate from, a remote procurement system 315. The remote procurement system 315 is external to the external electronic marketplace 305. It should be noted that, in this example, the user may access the external electronic marketplace 305 from a network 306 without the use of an internal network and/or virtual private network. In at least one example, a registration manager 318, a module of the reverse procurement service 302, may be configured to receive the registration information via an application programming interface 316, either from the external electronic marketplace 305 or from the user. The registration manager 318 may create a user profile to store the received registration information and pass the information to a user profile manager 320. In at least one example, registration information includes an indication of an affiliation between the user and a company. The user profile manager 320, a module of the reverse procurement service 302, may be responsible for managing the creation, deletion, and modification of user profiles. The user profile may then be stored in a user profile data store 322, a data store either internal or external to the reverse procurement service 302 or remote or local to the reverse procurement service provider computers 210, responsible for storing such information.

In at least one embodiment, the user may select various items via a graphical user interface provided by the external electronic marketplace 305, or alternatively, user selections may be input by the user or other users, via one of the aforementioned various electronic devices via a graphical user interfaces generated by the graphical user interface module 314 of the reverse procurement service. The selections may be received by the reverse procurement service 302 via an application programming interface 316. These items may be stored in an electronic shopping cart associated and stored with the user's profile. The user may then choose to check out. Upon check out, information pertaining to the shopping cart may be sent to the reverse procurement service 302 via an application programming interface 316. The information pertaining to the shopping cart may be stored within the external electronic marketplace 305, the reverse procurement service 302, or a data store responsible for storing such information. Once the shopping cart information is received by the reverse procurement service 302, an approval workflow manager 324 of the reverse procurement service 302, may determine or identify an appropriate workflow for purchase approval. In at least one example, the approval workflow manager 324 may retrieve information contained in the user's profile to determine the appropriate workflow. In at least one example, information retrieved may include employment information. In a further example, the appropriate workflow may be determined by internal rules contained in the approval workflow manager 324 or some other workflow data store 326 utilized to store such information. For instance, it may be the case that the user has registered an affiliation with Company A. An approval workflow for Company A may have previously been determined to consist of various tasks to be completed to obtain approval to use Company A's payment information in order to obtain the requested items. For instance, it may be determined that a particular application programming interface must be utilized, containing particular field values in order to stimulate Company A's internal procurement system to begin an internal approval workflow.

In at least one embodiment, the appropriate workflow may cause the approval workflow manager 324 to send an approval request to a remote procurement system 328 utilizing an application programming interface 316. The approval request may stimulate the remote procurement system 328 to obtain approval for the requested items using various standard processes typical to such systems. Once the items have been approved, the remote procurement system 328 may send to the reverse procurement service 302, payment information pertaining to the approved items.

In at least one embodiment, a payment module 330 of the reverse procurement service 302 may receive payment information via the application programming interface 316 from the external electronic marketplace 114 or from the remote procurement system 328. The payment module 330 may process the payment information, and upon verification of successful payment, communicate to the approval workflow manager 324 that the approved items have been successfully purchased. The approval workflow manager 324, upon receipt of this communication may then stimulate a communications manager module 332 of the reverse procurement service 302 to communicate to the user that the items have been purchased. In one example, the approval workflow manager 324 may prompt the user for delivery information, if delivery information had not been previously been provided by the user either through registration or upon checkout. In another example, the approval workflow manager 324 may query the user profile manager 320 for shipping preferences stored in the user's profile. Once delivery information has been obtained, the approval workflow manager 324 may determine and execute an appropriate workflow to provide the items to the user, according to the submitted delivery information. A similar process, as described above, may be utilized should the user wish to rent or lease the approved items.

In the manner described above, the user is enabled to procure items from an external electronic marketplace 114 utilizing the remote procurement system 328, without personally accessing the remote procurement system 328, making the procurement of items more efficient which in turn, improves the overall experience of the user.

Figure 4:
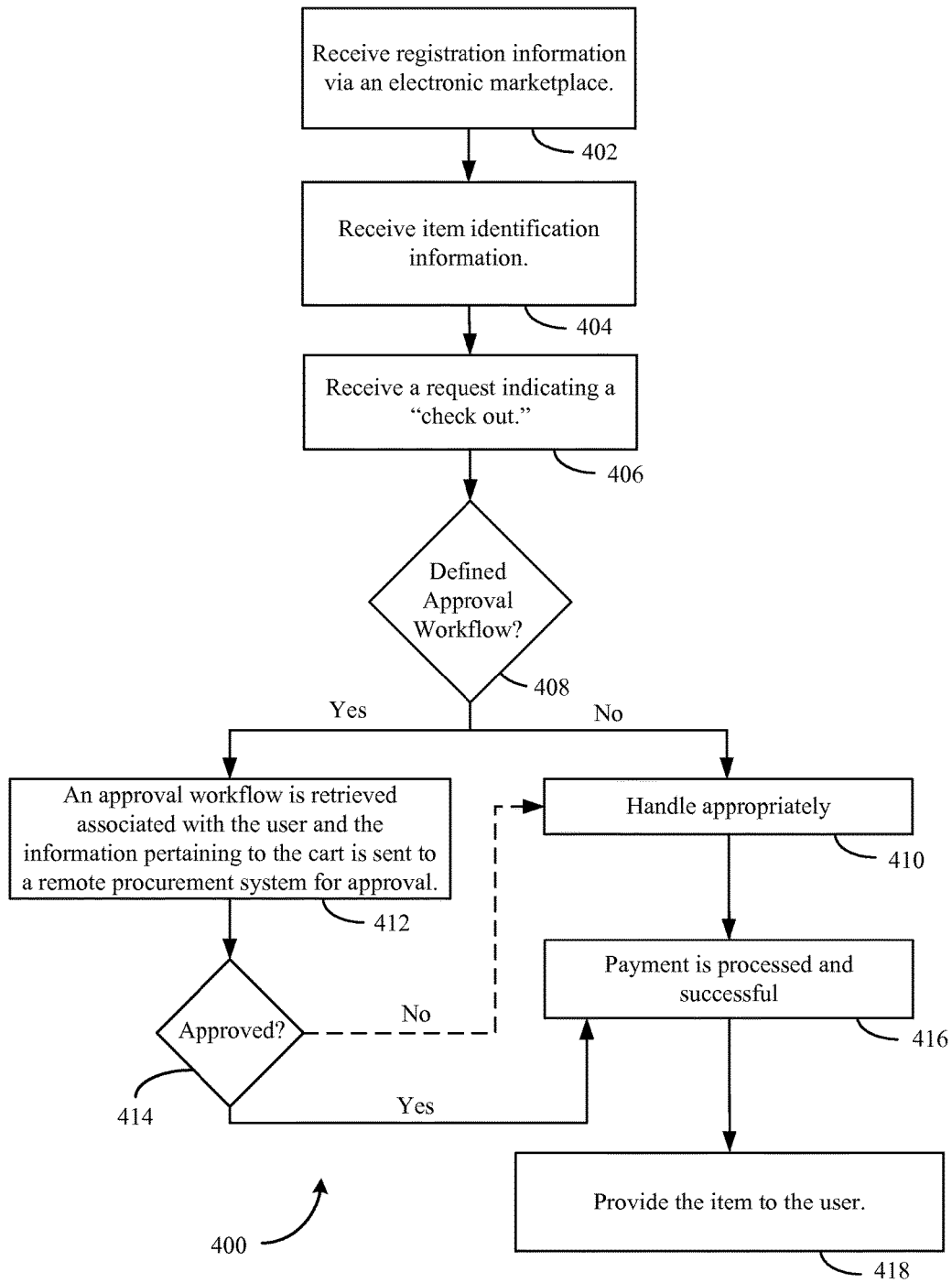
FIG. 4 is a flowchart illustrating a method for procuring items utilizing a reverse procurement service in accordance with at least one embodiment.

FIG. 4 is a flowchart illustrating a method for procuring items utilizing a reverse procurement service, such as the reverse procurement service 302 in accordance with at least one embodiment. In this example, registration information is received by the reverse procurement service (e.g., the reverse procurement service 302) from a user via an electronic marketplace at block 402. At block 404, item identification information is received. The user may search for various items via an external electronic marketplace 305 by utilizing a search query, bar code scanning application, or some other suitable search technique, in order to select items to be placed in his electronic shopping cart. The user may conduct this search from a public network without the need for access to his employer's internal procurement system. Upon placement of the items in the user's shopping cart, item identification information may be received from the electronic marketplace by the transmission of shopping cart information pertaining to a number of items. When the user determines that he wishes to procure the items in his cart, he may make such an indication via the external electronic marketplace 305, for instance, by selecting "check out" from the shopping cart page. Alternatively, item information may be received by the reverse procurement service 302 only after the user has selected "check out." At block 406, the reverse procurement service 302 may receive, from the electronic marketplace 305, an indication that the user is requesting "check out" for the items in his or her electronic shopping cart. Upon check out, the reverse procurement service 302 may determine whether a defined approval workflow exists for the user at decision branch 408. If no workflow exists, the reverse procurement service 302 may handle the situation accordingly at block 410. For instance, the user may be prompted for registration information or personal payment information, the user may be returned to the shopping cart page, or any suitable action appropriate to resolve the lack of payment information for the requested items. In one example, it may be the case that the user has not properly registered resulting in the reverse procurement service 302 prompting the user for registration information. However, if a defined workflow does exist, the workflow may be retrieved and a request for approval including information pertaining to the electronic shopping cart may be sent, via the application programming interface 316, to the remote procurement system 328 at block 412. The reverse procurement service 302 then makes a determination as to whether the request is approved at decision branch 414. If the request is not approved, or no response is received from the remote procurement system 328, the reverse procurement service 302 may handle the situation accordingly at 410 as defined above. For instance, the reverse procurement service 302 may direct the user to the checkout page to enable the user to modify the shopping cart. In at least one example, the user may modify the shopping cart to remove unapproved items and attempt to check-out again resulting in returning to block 408 in the process. However, if payment is approved, indicated with receipt of payment information or some other suitable approval indication from the remote procurement system 328, the payment is processed at 416. In at least one example, payment information may have been previously ascertained and stored within the reverse procurement service 302 or, alternatively, within the user's profile. In this case, an approval indication may be received from the remote procurement system 328 and previously stored payment information may be retrieved from the user's profile. If payment is successful, the item may be shipped, or otherwise provided, to the user at block 418.

Figure 5:
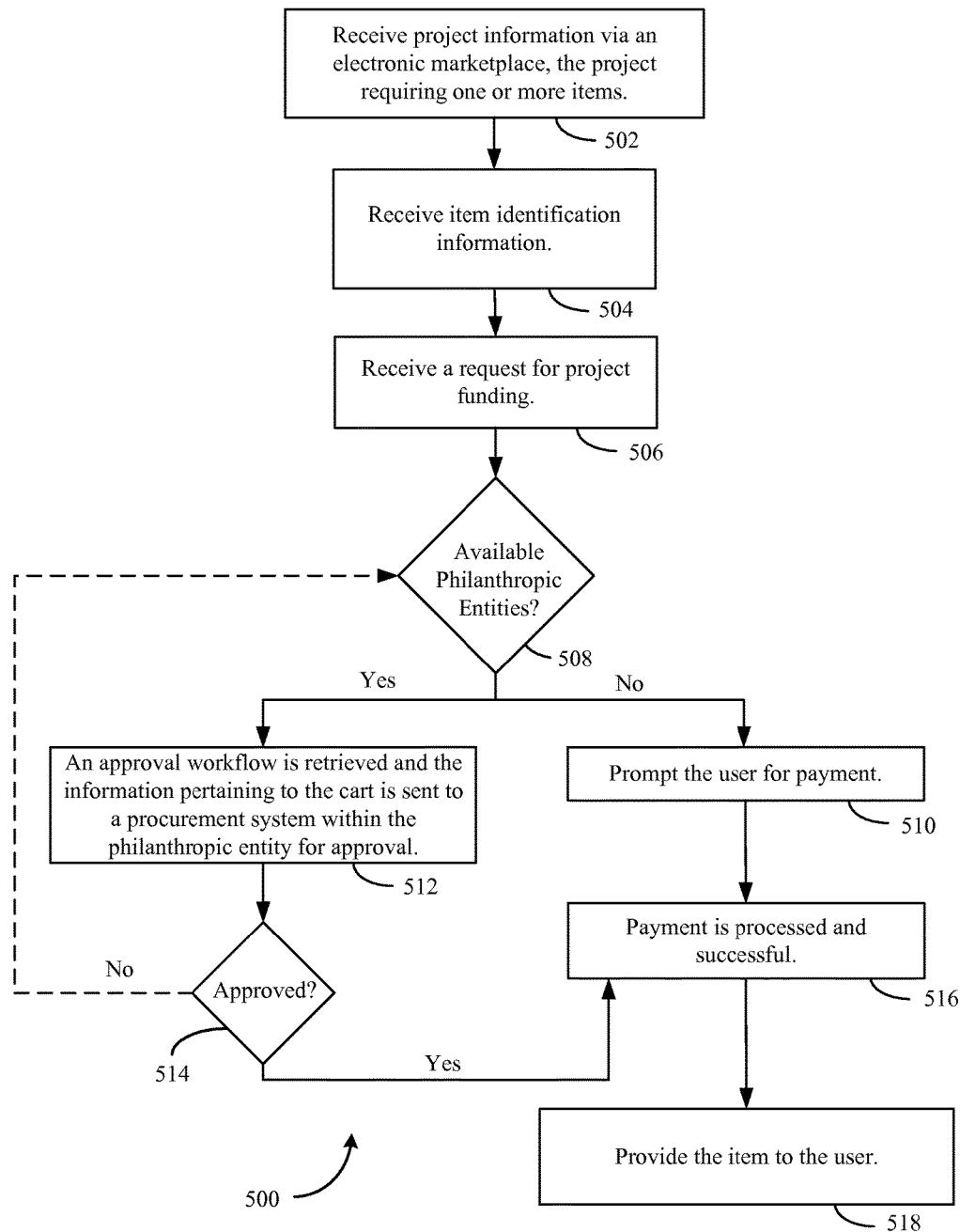
FIG. 5 is a flowchart illustrating a method for procuring items for charity utilizing a reverse procurement service in accordance with at least one other embodiment.

FIG. 5 is a flowchart illustrating a method for procuring items for charity utilizing a reverse procurement service (e.g., reverse procurement service 302 of FIG. 3) in accordance with at least one embodiment. In this example, project information is received by the reverse procurement service 302 from a user via the external electronic marketplace 305 at block 502. At block 404, the item identification information is received. The user may search for various items to include in the project via an external electronic marketplace 305 by utilizing a search query, bar code scanning application, or some other suitable search technique. As an example, a teacher, conducting a children's book drive, may search for, and add, various children's books to her cart. An item (e.g., a children's book) may be associated with the project when the teacher places the item in her electronic shopping cart. The teacher may conduct this search from a public network without the need for access to any funding entity's internal procurement system. Upon placement of the items in the user's shopping cart, item identification information may be received from the electronic marketplace 305 by the transmission of shopping cart information pertaining to a number of items. When the user determines that she wishes to procure the items in her cart, she may make such an indication via the electronic marketplace, for instance, by selecting "check out" from the shopping cart details page. Alternatively, item information may be received by the reverse procurement service 302 only after the user has selected "check out." At block 506, a request for project funding is received indicated by the receipt of shopping cart information subsequent to the "check out" selection. Upon receiving the request for funding, the reverse procurement service 302 may determine whether any previously registered philanthropic entities are available to provide funding at decision branch 508. For instance, it may be the case that various philanthropic or other entities may have previously registered via the external electronic marketplace 305 as having an interest in a particular field of philanthropy or, in some cases, a particular philanthropic endeavor. Continuing with the current example, the teacher, upon registration of the project, may indicate a particular charity associated with the project, or perhaps indicate a general association with a philanthropic endeavor (e.g., the children's book drive). Additionally, Company A may have indicated, via a registration process within the external electronic marketplace 305, that it is interested in charities/projects related to children, or perhaps children's book drives in general. Thus, upon checkout, Company A may be selected as a possible funding source for the books contained in the teacher's electronic shopping cart. Company A may solely fund the entire project or, alternatively, other entities may be contacted and payment information from one or more of those entities may be utilized to procure one or more of the items associated with the project. If no interested entities can be determined for the project, then the user may be prompted for payment at block 510. However, if an interested entity is determined, then a request for funding may be sent to a remote procurement system external to the reverse procurement service 302 including information pertaining to the project at block 512. The reverse procurement service 302 may then make a determination as to whether the request is approved at decision branch 514 by either receipt of a response from the remote procurement system, or perhaps, a threshold of time passing with no response received from the remote procurement system. If the request is not approved, or approval is not received, additional philanthropic entities may be determined at decision branch 508 and the process may repeat until either the known philanthropic entities are exhausted or, alternatively, until funding for each item in the request is approved, by one or more philanthropic entities. If one or more payments are approved, the one or more payments are processed at 516. If payment is successful, the corresponding item(s) may be shipped, or otherwise provided, to the user at block 518.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of any embodiment.

Various embodiments of this disclosure are described herein, including the best mode known to the inventors for carrying out the embodiments. Variations of embodiments may become apparent to those of ordinary skill in the art upon reading the foregoing description. The inventors expect skilled artisans to employ such variations as appropriate and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by this disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising:
   a data store;
   a processor; and
   a memory comprising computer-readable instructions that, when executed with the processor, cause a reverse procurement service to, at least:
     provide an application programming interface (API) between the reverse procurement service and a remote procurement system of an entity, the remote procurement system operating in a private network separate from a public network of the reverse procurement service, the remote procurement system utilizing an intra-company procurement process of the entity for approving or denying procurement requests;
     store, based at least in part on a registration process of an electronic marketplace, a first association between a project and a charitable organization and a second association between the entity and the charitable organization;
     store an approval workflow specific to the entity, the approval workflow identifying the API and a sequence of tasks for causing, by the reverse procurement service, the remote procurement system of the entity to execute at least one operation;
     receive, at the reverse procurement service from the electronic marketplace, a procurement request to acquire an item associated with the project;
     determine that the project and the entity are associated with the charitable organization;
     identify the API from the approval workflow specific to the entity; and
     transmit, by the reverse procurement service, data associated with the procurement request to the remote procurement system according to the sequence of tasks identified in the approval workflow, the transmission of the data associated with the procurement request being transmitted utilizing the API identified in the approval workflow, wherein transmitting the data associated with the procurement request causes the remote procurement system to perform one or more operations that include approving or denying the procurement request utilizing the intra-company procurement process of the entity.

2. The system of claim 1, wherein transmitting the data associated with the procurement request to the remote procurement system to procure the item further comprises instructions that cause the system to: receive, by the reverse procurement service of the public network from the remote procurement system of the private network, a response associated with the procurement request, the response indicating that the procurement request was approved.

3. The system of claim 2, wherein the computer-readable instructions, when executed with the processor, further cause the reverse procurement service to:
generate, by the reverse procurement service, a notification indicating that the procurement request to acquire the item has been approved; and
receive, by the reverse procurement service, an indication to proceed with delivery of the item.

4. The system of claim 2, wherein the response received from the remote procurement system comprises billing information associated with the entity.

5. The system of claim 1, wherein the item may include at least one of a physical item, digital item or service items.

6. The system of claim 1, wherein transmitting the data associated with the procurement request to the remote procurement system according to the approval workflow further utilizes a secure channel between the reverse procurement service and the remote procurement system.

7. A non-transitory computer-readable medium storing computer executable instructions that, when executed by one or more computer systems, cause the one or more computer systems to, at least:
provide an application programming interface (API) between a reverse procurement service and a remote procurement system of an entity, the remote procurement system operating in a private network separate from a public network of the reverse procurement service, the remote procurement system of the entity utilizing an intra-company procurement process of the entity for approving or denying procurement requests;
store, based at least in part on a registration process of an electronic marketplace, a first association between a user and a charitable organization and a second association between the entity and the charitable organization;
store an approval workflow of the entity for utilizing the remote procurement system, the approval workflow identifying the API and a sequence of tasks for causing, by the reverse procurement service, the remote procurement system of the entity to execute at least one operation;
receive, by the reverse procurement service, a procurement request to acquire an item associated with a project,
determine that the project and the entity are associated with the charitable organization;
identify the API from the approval workflow specific to the entity; and
transmit data associated with the procurement request to the remote procurement system according to the approval workflow, the transmission of the data associated with the procurement request being transmitted utilizing the API between the reverse procurement service of the public network and the remote procurement system of the private network, wherein transmitting the data associated with procurement request causes the remote procurement system to approve or deny the procurement request utilizing the intra-company procurement process of the entity.

8. The non-transitory computer-readable medium of claim 7, wherein the procurement request is initiated by a user from an electronic shopping cart within the electronic marketplace.

9. The non-transitory computer-readable medium of claim 7, wherein the computer executable instructions that further cause the one or more computer systems to:
receive, from the remote procurement system of the entity, a response associated with the procurement request, the response indicating that the procurement request was denied;
responsive to receiving the response from the remote procurement system of the entity:
determine that a second entity is associated with the charitable organization, a second remote procurement system associated with the second entity operates in a second private network separate from the public network of the reverse procurement service, the second remote procurement system of the second entity utilizing a second intra-company procurement process of the second entity for approving or denying procurement requests;
identify a second approval workflow specific to the second entity, the second approval workflow identifying a second API and a second sequence of tasks for causing, by the reverse procurement service, the second remote procurement system of the second entity to execute an operation;
identify the second API from the second approval workflow specific to the second entity; and
transmit data associated with the procurement request to the second remote procurement system associated with the second entity according to the second approval workflow, the transmission of the data associated with the procurement request being transmitted utilizing the second API between the reverse procurement service of the public network and the second remote procurement system of the second private network, wherein transmitting the data associated with the procurement request causes the second remote procurement system to execute the operation that includes approving or denying the procurement request utilizing the second intra-company procurement process of the second entity.

10. The non-transitory computer-readable medium of claim 9, wherein the entity is different from the second entity.

* * * * *

UNITED STATES PATENT AND TRADEMARK OFFICE
CERTIFICATE OF CORRECTION

PATENT NO. : 10,185,985 B1
APPLICATION NO. : 14/040360
DATED : January 22, 2019
INVENTOR(S) : SaiPrasad Kapila et al.

Page 1 of 1

It is certified that error appears in the above-identified patent and that said Letters Patent is hereby corrected as shown below:

On the Title Page

Abstract
Delete: "reverse procurement service. Upon receive of payment"
Insert: --reverse procurement service. Upon receipt of payment--

Signed and Sealed this
Thirtieth Day of July, 2019

Andrei Iancu
*Director of the United States Patent and Trademark Office*